US012709543B2

(12) United States Patent
Kang et al.

(10) Patent No.: US 12,709,543 B2
(45) Date of Patent: Aug. 18, 2026

(54) CARBON NANOTUBE DISPERSION LIQUID, METHOD FOR PREPARING SAME, ELECTRODE SLURRY COMPOSITION COMPRISING SAME, ELECTRODE COMPRISING SAME, AND LITHIUM SECONDARY BATTERY COMPRISING SAME

(71) Applicant: BETTERIAL CO., LTD., Seongnam-si (KR)

(72) Inventors: Seong Kyun Kang, Gimpo-si (KR); Jin Yeong Lee, Seoul (KR); Kwang Hyun Yoo, Seoul (KR)

(73) Assignee: BETTERIAL Co., Ltd., Seongnam-si (KR)

( * ) Notice: Subject to any disclaimer, the term of this patent is extended or adjusted under 35 U.S.C. 154(b) by 223 days.

(21) Appl. No.: 18/700,709

(22) PCT Filed: Oct. 19, 2022

(86) PCT No.: PCT/KR2022/015905

§ 371 (c)(1),
(2) Date: Apr. 12, 2024

(87) PCT Pub. No.: WO2023/068781

PCT Pub. Date: Apr. 27, 2023

(65) Prior Publication Data

US 2024/0400393 A1 Dec. 5, 2024

(30) Foreign Application Priority Data

Oct. 19, 2021 (KR) ........................ 10-2021-0139170
Oct. 18, 2022 (KR) ........................ 10-2022-0133711

(51) Int. Cl.

| | |
|---|---|
| ***C01B 32/174*** | (2017.01) |
| ***C01B 32/159*** | (2017.01) |
| ***H01M 4/62*** | (2006.01) |
| ***H01M 10/052*** | (2010.01) |

(52) U.S. Cl.

CPC .......... *C01B 32/174* (2017.08); *C01B 32/159* (2017.08); *H01M 4/625* (2013.01); *H01M 10/052* (2013.01); *C01B 2202/02* (2013.01); *C01B 2202/22* (2013.01); *C01P 2004/61* (2013.01); *C01P 2004/62* (2013.01); *C01P 2006/22* (2013.01); *C01P 2006/40* (2013.01)

(58) Field of Classification Search

CPC . C01B 32/174; C01B 32/159; C01B 2202/02; C01B 2202/22; H01M 4/625; H01M 10/052; H01M 4/0404; H01M 10/0525; H01M 4/62; H01M 4/622; C01P 2004/61; C01P 2004/62; C01P 2006/22; C01P 2006/40; Y02E 60/10

See application file for complete search history.

(56) References Cited

U.S. PATENT DOCUMENTS

| | | | | |
|---|---|---|---|---|
| 2010/0248034 A1* | 9/2010 | Oki | ...................... | H01M 4/139 252/182.1 |
| 2022/0166027 A1* | 5/2022 | Kim | ...................... | H01M 4/131 |
| 2022/0376262 A1* | 11/2022 | Morita | ................. | H01M 4/625 |

FOREIGN PATENT DOCUMENTS

| | | | |
|---|---|---|---|
| EP | 3 805 154 | A1 | 4/2021 |
| EP | 3 936 475 | A1 | 1/2022 |
| EP | 4 050 679 | A1 | 8/2022 |
| EP | 4 099 432 | A1 | 12/2022 |
| EP | 4 195 308 | A1 | 6/2023 |
| JP | 2009-298625 | A | 12/2009 |
| JP | 2014181140 | A | 9/2014 |
| JP | 2015168610 | A | 9/2015 |
| JP | 2020163362 | A | 10/2020 |
| JP | 2021-520040 | A | 8/2021 |
| JP | 2022-525330 | A | 5/2022 |
| KR | 20130053015 | A | 5/2013 |
| KR | 20190093174 | A | 8/2019 |
| KR | 20190140275 | A | 12/2019 |
| KR | 20210023760 | A | 3/2021 |
| KR | 20210046692 | A | 4/2021 |
| WO | 2021/034145 | A1 | 2/2021 |
| WO | 2021/080006 | A1 | 4/2021 |

OTHER PUBLICATIONS

Xiaoyong Zhang et al. "Interaction of tannic acid with carbon nanotubes: enhancement of dispersibility and biocompatibility" Toxicology Research, Apr. 2015, pp. 160-168.
Communication dated Apr. 17, 2025 in Japanese Application No. 2024-547396.
Extended European Search Report dated Sep. 26, 2025 from the European Patent Office in Application No. 22884003.9.

* cited by examiner

*Primary Examiner* — Mark Kopec
*Assistant Examiner* — Jaison P Thomas
(74) *Attorney, Agent, or Firm* — Sughrue Mion, PLLC

(57) ABSTRACT

The present specification relates to a carbon nanotube dispersion liquid, a method for preparing same, an electrode slurry composition comprising same, an electrode comprising same, and a lithium secondary battery comprising same, the carbon nanotube dispersion liquid comprising carbon nanotubes; a first dispersant having an amide group; and a second dispersant having an aromatic ring, wherein the viscosity at 25° C. and a shear rate of 15 $sec^{-1}$ is 2,000 cPs or less.

16 Claims, No Drawings

CARBON NANOTUBE DISPERSION LIQUID, METHOD FOR PREPARING SAME, ELECTRODE SLURRY COMPOSITION COMPRISING SAME, ELECTRODE COMPRISING SAME, AND LITHIUM SECONDARY BATTERY COMPRISING SAME

TECHNICAL FIELD

The present specification claims priority to Korean Patent Application No. 10-2021-0139170, filed Oct. 19, 2021, and Korean Patent Application No. 10-2022-0133711, filed Oct. 18, 2022, the entire contents of which are incorporated herein for all purposes by this reference.

The present specification relates to a carbon nanotube dispersion liquid, a method of preparing the same, an electrode slurry composition including the same, an electrode including the same, and a lithium secondary battery including the same.

BACKGROUND ART

Secondary batteries are types of batteries capable of being repeatedly used through discharging processes in which chemical energy is converted to electrical energy and charging processes, that is, the reverse of the discharging processes. A secondary battery is composed of a positive electrode, a negative electrode, an electrolyte, and a separator. Each of the positive and negative electrodes typically includes an electrode current collector and an electrode active material layer formed on the electrode current collector. The electrode active material layer is formed by applying an electrode slurry composition including an electrode active material, a conductive additive, a binder, and the like on an electrode current collector, and then drying and rolling the resulting product.

In the related art, as conductive additives for improving the conductivity of electrode active materials, point-type conductive additives such as carbon black have been mainly used. However, point-type conductive additives are not highly effective in improving electrical conductivity, so excessive amounts thereof thus must be used to obtain sufficient effects, causing a problem in that the amount of electrode active materials included decreases, and battery capacity is reduced.

To solve such problems, attempts to apply highly conductive carbon nanotubes (CNTs) as conductive additives have been made. Carbon nanotubes can achieve high conductivity even when used in small amounts. Therefore, the use of carbon nanotubes is advantageous in that the amount of conductive additives included may be significantly reduced compared to the use of carbon black, thus increasing the electric capacity.

There is a need to prepare an aqueous dispersion liquid having low viscosity in terms of processability for utilizing carbon nanotubes as conductive additives for negative electrodes.

Polyvinylpyrrolidone (PVP), a dispersant having an amide group, is a polymer surfactant used in various dispersion systems as a dispersant, an emulsifier, a thickener, and the like and is known to be effective when dispersing carbon nanotubes (Patent Document 1).

Furthermore, polyacrylic acid, a type of polyacid having a carboxyl group, or tannic acid is also known to be effective in dispersing carbon nanotubes.

DOCUMENT OF RELATED ART

Patent Document

KR No. 10-2011-0118460

Non-Patent Document

Toxicol. Res., 2015, 4, 160-168

DISCLOSURE

Technical Problem

The present specification provides a carbon nanotube dispersion liquid, a method of preparing the same, an electrode slurry composition including the same, an electrode including the same, and a lithium secondary battery including the same.

Technical Solution

A first embodiment of the present disclosure provides a carbon nanotube dispersion liquid including carbon nanotubes, a first dispersant having an amide group, and a second dispersant having an aromatic ring, wherein the carbon nanotube dispersion liquid has a viscosity of 2,000 cPs or less at a temperature of 25° C. and a shear rate of 15 $sec^{-1}$.

A second embodiment of the present disclosure provides a method of preparing a carbon nanotube dispersion liquid, the method involving mixing carbon nanotubes, a first dispersant having an amide group, and a second dispersant having an aromatic ring, wherein the carbon nanotube dispersion liquid is the carbon nanotube dispersion liquid described above.

A third embodiment of the present disclosure provides an electrode slurry composition including the carbon nanotube dispersion liquid described above, an electrode active material, and a binder.

A fourth embodiment of the present disclosure provides an electrode including an electrode active material layer formed by the electrode slurry composition described above.

A fifth embodiment of the present disclosure provides a lithium secondary battery including the electrode described above.

Advantageous Effects

A carbon nanotube dispersion liquid, according to an embodiment of the present disclosure, has a significantly low viscosity and can improve the dispersibility of carbon nanotubes in the dispersion liquid.

The carbon nanotube dispersion liquid, according to an embodiment of the present disclosure, has excellent coating properties and processability when used to manufacture an electrode.

BEST MODE

Hereinafter, the present disclosure will be described in detail.

A carbon nanotube dispersion liquid, according to an embodiment of the present disclosure, refers to a dispersion liquid containing carbon nanotubes, specifically meaning that carbon nanotubes are dispersed in the dispersion liquid and do not aggregate with each other.

A first embodiment of the present disclosure provides a carbon nanotube dispersion liquid including carbon nanotubes, a first dispersant having an amide group, and a second dispersant having an aromatic ring, wherein the carbon nanotube dispersion liquid has a viscosity of 2,000 cPs or less at a temperature of 25° C. and a shear rate of 15 $sec^{-1}$.

The carbon nanotube dispersion liquid includes the first dispersant having an amide group and the second dispersant having an aromatic ring, such that the viscosity of the dispersion liquid may be reduced. In particular, the complex structure of the second dispersant having the aromatic ring may effectively reduce the viscosity of the dispersion liquid.

In particular, in the case where the second dispersant has a functional group (hydroxyl group or carboxyl group), the oxygen of the amide group contained in the first dispersant and the functional group (hydroxyl group or carboxyl group) of the second dispersant form a hydrogen bond with each other, which is effective in reducing the viscosity of the dispersion liquid. However, this hydrogen bond is so strong that there is a problem in that insoluble products or complexes are formed. In this case, there are many restrictions on selecting the dispersants, including control of the amounts of the first and second dispersants included, use of only certain types of first and/or second dispersants, or the like.

The inventors of the present disclosure developed the dispersion liquid in which even when the first and second dispersants described above are included, the aggregation of these dispersants with each other was reduced, thereby completing the present disclosure. The reduction of the aggregation may be verifiable by preparing a carbon nanotube dispersion liquid including the materials described above, leaving the dispersion liquid for a predetermined period, and visually observing the occurrence of aggregation.

The carbon nanotube dispersion liquid, according to the embodiment of the present disclosure, is characterized in that despite containing the carbon nanotubes having excellent conductivity while improving the dispersibility of the carbon nanotubes, thereby minimizing the aggregation of the carbon nanotubes with each other. Such characteristics may be verifiable by the significantly low viscosity of the dispersion liquid.

In the embodiment of the present disclosure, the carbon nanotube dispersion liquid may have a viscosity of 2,000 cPs or less, 1,000 cPs or less, 800 cPs or less, 700 cPs or less, or 500 cPs or less, at a temperature of 25° C. and a shear rate of 15 $sec^{-1}$. Considering the purpose of the present disclosure, the lower the viscosity, the more it is beneficial. Thus, the lower limit is not particularly limited, but the viscosity may be 10 cPs or more, 30 cPs or more, or 50 cPs or more. When the above numerical range of the viscosity is satisfied, the carbon nanotubes in the carbon nanotube dispersion liquid may not aggregate with each other, and the processability may be improved when used to manufacture an electrode.

The viscosity of the carbon nanotube dispersion liquid may be measured by methods commonly used in the field to which this technology pertains. For example, the viscosity may be measured using a DVNextCP rheometer manufactured by Brookfield at a measurement temperature of 25° C. and a shear rate of 15 $sec^{-1}$. For a further accurate measurement, the viscosity may be measured after storing the prepared carbon nanotube dispersion liquid at a temperature of 25° C. for one week.

The viscosity of the carbon nanotube dispersion liquid may be adjusted by controlling the amounts of the first and second dispersants included or by adding an alkali metal salt, which will be described later, to the dispersion liquid.

In the embodiment of the present disclosure, the carbon nanotube dispersion liquid is characterized by including the first dispersant having an amide group and the second dispersant having an aromatic ring. The first dispersant having an amide group is effective in dispersing the carbon nanotubes, and the complex structure of the second dispersant having an aromatic ring may effectively reduce the viscosity of the dispersion liquid. Additionally, the oxygen of the amide group contained in the first dispersant and the functional group (hydroxyl group or carboxyl group) of the second dispersant form a hydrogen bond with each other, which is effective in reducing the viscosity of the dispersion liquid.

In the embodiment of the present disclosure, the first dispersant has an amide group, thereby forming a hydrogen bond with the hydroxyl or carboxyl group of the second dispersant, which will be described later.

In the embodiment of the present disclosure, the first dispersant may include one or more types selected from the group consisting of polyvinylpyrrolidone, polyesteramide, polycarboxylic acid amide, polyamidoamine, thioamidoamine, and a water-soluble nylon compound. The first dispersant has an amide group, thereby demonstrating the effects of further improving the viscosity and preventing changes in the viscosity from occurring over time.

In the embodiment of the present disclosure, the first dispersant may have a weight average molecular weight in a range of 1,000 g/mol to 100,000 g/mol, which is preferably in the range of 2,000 g/mol to 80,000 g/mol, more preferably in the range of 2,000 g/mol to 30,000 g/mol, and even more preferably in the range of 2,000 g/mol to 15,000 g/mol. When the weight average molecular weight of the first dispersant is less than 1,000 g/mol, there may be problems in that the dispersion performance of the carbon nanotubes deteriorates, and the first dispersant is eluted when manufacturing an electrode. When the weight average molecular weight of the first dispersant exceeds 100,000 g/mol, the viscosity of the carbon nanotube dispersion liquid may increase, thereby deteriorating coating properties and processability. Therefore, the weight average molecular weight of the first dispersant is preferably adjusted to fall within the above numerical range.

In the embodiment of the present disclosure, the second dispersant may have a hydroxyl group or a carboxyl group. The second dispersant has a hydroxyl group or carboxyl group, thereby forming a hydrogen bond with the amide group of the first dispersant described above.

In the embodiment of the present disclosure, the second dispersant may contain two or more aromatic rings. For example, the second dispersant may include one or more types selected from the group consisting of baicalin, luteolin, taxifolin, myricetin, quercetin, rutin, catechin, epigallocatechin gallate, butein, piceatenol, and tannic acid. Preferably, the second dispersant is tannic acid, quercetin, epigallocatechin gallate, or a combination thereof.

In the embodiment of the present disclosure, in the case of using both the first and second dispersants, the effect of dispersion may be improved compared to the case of using each dispersant alone.

In the embodiment of the present disclosure, the second dispersant may be a phenol-based compound. The phenol-based compound may have a structure in which one or more of the aromatic rings include one or more structures selected from the group consisting of a phenol structure, a catechol structure, a gallol structure, and a naphthol structure. The phenol structure is a structure in which one hydroxyl group is bonded to a benzene ring, the catechol structure is a structure in which two hydroxyl groups are bonded to a benzene ring, the gallol structure is a structure in which three hydroxyl groups are bonded to a benzene ring, and the naphthol structure is a structure in which one hydroxyl group is bonded to naphthalene.

In the embodiment of the present disclosure, the carbon nanotube dispersion liquid includes the first dispersant and the second dispersant in a weight ratio in a range of 1:10 to 10:1, which is preferably in the range of 1:5 to 5:1 or 1:1 to 1:5. When the above numerical range is satisfied, the effect of dispersing the carbon nanotubes may be improved, thereby keeping the viscosity of the dispersion liquid low.

In the embodiment of the present disclosure, the carbon nanotubes, configured to improve the conductivity of electrodes, have a cylindrical form in which a graphite sheet has a nano-sized diameter while having a $sp^2$-bonded structure. In this case, the characteristics of a conductor or semiconductor are exhibited depending on the angle and structure at which the graphite surface is rolled. Depending on the number of bonds forming the wall, carbon nanotubes are divided into single-walled carbon nanotubes (SWCNTs), double-walled carbon nanotubes (DWCNTs), and multi-walled carbon nanotubes (MWCNTs), which may be appropriately selected depending on the purpose of dispersion liquids. Additionally, the carbon nanotubes may have a two-dimensional structure in which a plurality of carbon nanotubes is aggregated or arranged, which may be, for example, bundle-type carbon nanotubes where a plurality of carbon nanotubes is arranged or aligned side by side in a uniform direction in a bundle-like or rope-like form or entangled-type carbon nanotubes where a plurality of carbon nanotubes is tangled without a uniform direction in a spherical or potato-like form.

In the embodiment of the present disclosure, the carbon nanotubes may be single-walled carbon nanotubes (SWCNTs).

In the embodiment of the present disclosure, the carbon nanotubes may have a specific surface area (BET) in a range of 10 $m^2/g$ to 5,000 $m^2/g$, which is preferably in the range of 30 $m^2/g$ to 3,000 $m^2/g$ and more preferably in the range of 50 $m^2/g$ to 2,000 $m^2/g$. When the above numerical range is satisfied, the effect of improving conductivity is excellent. The specific surface area (BET) of the carbon nanotubes may vary depending on the types of carbon nanotubes.

In the embodiment of the present disclosure, the single-walled carbon nanotubes may have a specific surface area (BET) in a range of 800 $m^2/g$ to 5,000 $m^2/g$, which is preferably in the range of 800 $m^2/g$ to 3,000 $m^2/g$ and more preferably in the range of 900 $m^2/g$ to 2,000 $m^2/g$. When the above numerical range is satisfied, the effect of improving conductivity is excellent.

In the embodiment of the present disclosure, the carbon nanotubes may have a median particle size (D50) in a range of 0.1 μm to 20 μm, which is preferably in the range of 0.5 μm to 1 μm, 1 μm to 5 μm, or 2 μm to 4 μm. The median particle size (D50) refers to a particle size corresponding to 50% of the cumulative number of carbon nanotubes in the particle size distribution curve. The median particle size (D50) may be measured, for example, using a laser diffraction method. Within the above numerical range, the carbon nanotubes may not aggregate with each other while improving dispersibility.

In the embodiment of the present disclosure, the carbon nanotubes may be contained in an amount in a range of 0.01 wt % to 20 wt % based on the total weight of the carbon nanotube dispersion liquid, which is preferably in the range of 0.1 wt % to 10 wt % or 0.1 wt % to 8 wt %. The amount of the carbon nanotubes contained may be appropriately controlled depending on the specific surface area of the carbon nanotubes used. For example, in the case of using carbon nanotubes having a specific surface area of 800 $m^2/g$ or larger, the amount of the carbon nanotubes contained may be in a range of 0.01 wt % to 5 wt % based on the total weight of the carbon nanotube dispersion liquid, which is preferably in the range of 0.01 wt % to 3 wt % and more preferably in the range of about 0.01 wt % to 2 wt %. When the specific surface area and amount of the carbon nanotubes contained do not fall within the above numerical ranges, the loading amount is reduced when manufacturing an electrode, resulting in an increase in process costs. Additionally, there may be a problem of binder migration when drying an electrode, leading to a decrease in adhesive strength, an increase in the viscosity of the carbon nanotube dispersion liquid, or the like.

In the embodiment of the present disclosure, the carbon nanotubes may include two or more carbon nanotube monomers. The carbon nanotube monomers may have a cylindrical form in which a graphite sheet has a nano-sized diameter while having a $sp^2$-bonded structure.

In the embodiment of the present disclosure, the carbon nanotube monomers may have a diameter in a range of 1 nm or larger and 200 nm or smaller, 1 nm or larger and 150 nm or smaller, or 1 nm or larger and 100 nm or smaller. Within the above numerical range, the dispersibility of the carbon nanotubes may be improved, and resistance may be prevented from increasing when applied to an electrode.

In the embodiment of the present disclosure, the carbon nanotube monomers may have a length in a range of 0.1 μm or greater and 200 μm or smaller, 0.1 μm or greater and 150 μm or smaller, or 0.5 μm or greater and 100 μm or smaller. Within the above numerical range, the dispersibility of the carbon nanotubes may be improved, and resistance may be prevented from increasing when applied to an electrode.

In the embodiment of the present disclosure, the carbon nanotubes may have an aspect ratio (length/diameter) in a range of 5 to 50,000 or 10 to 15,000. Within the above numerical range, the dispersibility of the carbon nanotubes may be improved, and resistance may be prevented from increasing when applied to an electrode.

In the embodiment of the present disclosure, the carbon nanotube dispersion liquid may contain an alkali metal element. As the carbon nanotube dispersion liquid of the present disclosure contains the alkali metal element, the dispersibility of the material contained in the dispersion liquid may be improved. Specifically, while the first and second dispersants included in the dispersion liquid may form a complex with each other, such a complex has a problem of causing an increase in the viscosity of the dispersion liquid due to low solubility in solvents such as water. However, the problem described above may be solved through the disintegration of the complex by the alkali metal contained in the carbon nanotube dispersion liquid of the present disclosure.

In the embodiment of the present disclosure, the form of the alkali metal is not particularly limited, but the alkali metal may be present in the form of an alkali metal salt containing an alkali metal.

In the embodiment of the present disclosure, the alkali metal element may be contained in an amount in a range of 1 ppm or more and 300 ppm or less, 5 ppm or more and 200 ppm or less, or 5 ppm or more and 150 ppm or less, based on the total amount of the carbon nanotube dispersion liquid.

In the embodiment of the present disclosure, the carbon nanotube dispersion liquid may contain one or more types of alkali metal salts selected from the group consisting of KOH, NaOH, LiOH, $KOHH_2O$, $NaOHH_2O$, $LiOHH_2O$, $K_2CO_3$, $Na_2CO_3$, and $LiCO_3$.

In the embodiment of the present disclosure, the first dispersant includes a polyvinylpyrrolidone-based resin. Additionally, the molar ratio of the alkali metal salt based on 100 mol of vinylpyrrolidone monomers contained in the polyvinylpyrrolidone-based resin may be 60 mol or less, which is preferably 30 mol or less or 25 mol or less. The lower limit of the amount is not particularly limited but may be 0.1 mol or more, 1 mol or more, or 2 mol or more. When the above numerical range is satisfied, the viscosity of the carbon nanotube dispersion liquid may be adjusted to 2,000 cPs or less at a temperature of 25° C. and a shear rate of 15 $sec^{-1}$.

The molar ratio of the alkali metal salt may be calculated using the molecular weight of the alkali metal salt and vinylidone monomers and the wt % of the alkali metal salt and polyvinylidene, which may be specifically calculated through Equation 3 below.

$$\text{Molar ratio of alkali metal salt} = \{(\text{wt \% of alkali metal salt})/(\text{molecular weight of alkali metal salt})\}/\{(\text{wt \% of polyvinylidone})/(\text{molecular weight of vinylidone monomers})\} * 100 \quad \text{[Equation 3]}$$

For example, in the case where the amounts of polyvinylpyrrolidone and the alkali metal salt (LiOH) are 0.6 wt % and 0.01 wt %, respectively, the molecular weight of the alkali metal salt (LiOH) is 24 g/mol, and the molecular weight of the vinylidone monomers is 111.14 g/mol, based on the total weight of the dispersion liquid, the molar ratio of the alkali metal salt based on 100 mol of the vinylpyrrolidone monomers is calculated to 7.7 mol [7.7={(0.01)/(24)}/{(0.6)/(111.14)}*100].

The vinylpyrrolidone monomer refers to a monomer composed of a 5-membered lactam linked to a vinyl group and indicates a unit constituting the polyvinylpyrrolidone-based resin. Specifically, this may be a monomer represented by Formula 2 among polyvinylpyrrolidone represented by Formula 1 below.

[Formula 1]

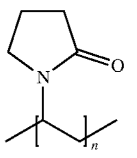

[Formula 2]

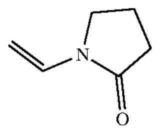

In the embodiment of the present disclosure, the carbon nanotube dispersion liquid may further contain a solvent. The solvent is used to pre-disperse and supply the carbon nanotubes to the carbon nanotube dispersion liquid to prevent aggregation when directly mixing the carbon nanotubes with an electrode active material and using the resulting mixture as an electrode slurry composition.

In the embodiment of the present disclosure, the solvent may be an aqueous solvent. For example, the aqueous solvent may be water. In this case, adjusting the viscosity of the dispersion liquid may be effective.

In the embodiment of the present disclosure, the carbon nanotube dispersion liquid may have a pH in a range of 3 to 10, which is preferably in the range of 4 to 9 or 5 to 8. Within the above numerical range, the aggregation of the first and second dispersants mentioned above may be further prevented. Specifically, when the pH of the dispersion liquid does not fall within the above numerical range, the strength of the surface charges of the first and second dispersants may become so strong or weak that hydrogen bonds may become extremely strong, resulting in significant aggregation. In this case, the aggregation of the first and second dispersants may be further prevented by adjusting the pH of the dispersion liquid to fall within the above numerical range. The pH may be measured at a temperature of 25° C.

In the embodiment of the present disclosure, a value expressed by Equation 1 below regarding the carbon nanotube dispersion liquid may be in a range of 2 to 10, which is preferably in the range of 2 to 6.5 or 3 to 6. The value expressed by Equation 1 below, which is the shear thinning index of the dispersion liquid, refers to the ratio of viscosity measured at varying shear rates. When the above numerical range is satisfied, a reduction in fluidity may be prevented due to extremely high viscosity in a standing state, enabling uniform mixing when manufacturing an electrode. Additionally, storage stability may be improved by preventing sedimentation of carbon nanotube particles.

$$\text{Shear thinning index } (STI) = V_{low}/V_{high} \quad \text{[Equation 1]}$$

In Equation 1 above, $V_{low}$ is the viscosity of the dispersion liquid measured at a temperature of 25° C. and a shear rate of 15 $sec^{-1}$, and $V_{high}$ is the viscosity of the dispersion liquid measured at a temperature of 25° C. and a shear rate of 150 $sec^{-1}$.

In the embodiment of the present disclosure, a value calculated by Equation 2 below regarding the carbon nanotube dispersion liquid may be in a range of 1 to 5, which is preferably in the range of 1 to 3 or 1.1 to 2. The value calculated by Equation 2 below demonstrates the relationship between the characteristics of the shear thinning index (STI) of the dispersion liquid described above and the median particle size of the carbon nanotubes contained in the dispersion liquid.

Typically, when the particle size (D50) of carbon nanotubes is excessively small, the shear thinning index (STI) of the dispersion liquid tends to increase as the carbon nanotubes aggregate with each other. Additionally, when the particle size (D50) of carbon nanotubes is excessively large, the carbon nanotubes fail to be sufficiently dispersed. As a result, while the carbon nanotubes form a network structure, the overall viscosity and shear thinning index (STI) of the dispersion liquid tend to increase. However, by adjusting the value calculated by Equation 2 below to fall within the above numerical range, the carbon nanotube dispersion liquid, according to the embodiment of the present disclosure, may be effective in improving the viscosity stability of the entire dispersion liquid over time even when the particle size of the carbon nanotube is small.

$$\frac{STI}{D50/\mu m}$$ [Equation 2]

In Equation 2 above,

STI is the shear thinning index (STI) of the dispersion liquid, and

D50 is the median particle size (D50) of the carbon nanotubes.

A second embodiment of the present disclosure provides a method of preparing the carbon nanotube dispersion liquid described above, the method involving a step of mixing carbon nanotubes, a first dispersant having an amide group, and a second dispersant having an aromatic ring.

In the embodiment of the presets, the step of mixing the carbon nanotubes, the first dispersant having an amide group, and and the second dispersant having an aromatic ring may be performed under temperature conditions where physical properties do not change. For example, this step may be performed at a temperature of 50° C. or lower and, more specifically, at a temperature in the range of 5° C. and 50° C.

In the embodiment of the present disclosure, a step of dispersing the carbon nanotubes in a dispersion liquid may be further included.

In the embodiment of the present disclosure, the step of dispersing the carbon nanotubes in the dispersion liquid may be performed by methods using a ball mill, a bead mill, a disc mill, a basket mill, a high-pressure homogenizer, or the like and, more specifically, be performed by milling methods using a disk mill or a high-pressure homogenizer.

During milling using the disc mill, the size of beads may be appropriately determined depending on the type and amount of carbon nanotubes and the type of dispersant. Specifically, the diameter of the beads may be in a range of 0.1 mm to 5 mm, which may be more specifically in the range of 0.5 mm to 4 mm. Additionally, this bead milling process may be performed at a speed in a range of 2,000 rpm to 10,000 rpm and, more specifically, at a speed in the range of 5,000 rpm to 9,000 rpm.

Milling using the high-pressure homogenizer, for example, is performed by forces such as cavitation, shear, impact, and explosion when allowed to pass through the gap by compressing the resulting mixture with a plunger pump of the high-pressure homogenizer and pushing the same through the gap of the homogenization valve.

Additionally, milling using the high-pressure homogenizer may be performed at a speed in a range of 2,000 rpm to 10,000 rpm and, more specifically, at a speed in the range of 2,000 rpm to 5,000 rpm.

Milling using the high-pressure homogenizer may be performed under a condition at a pressure in a range of 500 bar or 3,000 bar and, more specifically, under a condition at a pressure in the range of 1,000 bar to 2,000 bar.

In the embodiment of the present disclosure, the step of dispersing the carbon nanotubes in the dispersion liquid may be performed for 10 minutes to 120 minutes and, more specifically, for 20 minutes to 90 minutes so that the carbon nanotubes may be sufficiently dispersed.

A third embodiment of the present disclosure provides an electrode slurry composition including the carbon nanotube dispersion liquid described above, an electrode active material, and a binder.

In the embodiment of the present disclosure, the electrode active material includes a silicon-based electrode active material. The silicon-based electrode active material may include one or more types selected from the group consisting of metal silicon (Si), a silicon oxide (SiOx, where $0<x<2$), silicon carbide (SiC), and a Si—Y alloy (where Y is an element selected from the group consisting of an alkali metal, an alkaline earth metal, an element of group 13, an element of group 14, a transition metal, a rare-earth element, and a combination thereof, but not Si). The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fc, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

In the embodiment of the present disclosure, the silicon-based electrode active material exhibits higher capacity characteristics than carbon-based electrode active materials. Therefore, when the silicon-based electrode active material is additionally included, further excellent capacity characteristics may be obtained. Still, the volume of the silicon-based electrode active material greatly changes during charging and discharging. Thus, when being repeatedly charged and discharged, battery characteristics rapidly deteriorate, so cycle characteristics are insufficient, making the silicon-based electrode active material challenging to commercialize. However, in the case of using carbon nanotubes as a conductive additive as in the present disclosure, cycle characteristics may be improved when applying the silicon-based electrode active material. As a result, when using the electrode slurry composition of the present disclosure, including the carbon nanotube dispersion liquid of the present disclosure and the silicon-based electrode active material, a secondary battery having excellent capacity characteristics and cycle characteristics may be implemented.

In the embodiment of the present disclosure, the electrode active material may further include other types of electrode active materials along with the silicon-based electrode active material. Examples of the other types of electrode active materials used may include: carbonaceous materials, such as artificial graphite, natural graphite, graphitized carbon fibers, and amorphous carbon; metallic compounds capable of forming an alloy with lithium, such as Al, Sn, Pb, Zn, Bi, In, Mg, Ga, Cd, Si alloys, Sn alloys, or Al alloys; metal oxides capable of doping and undoping lithium, such as SnO2, vanadium oxide, and lithium vanadium oxide; composites containing the metallic compound and the carbonaceous material described above, such as Sn—C composites; or the like. Among these materials, carbonaceous materials are particularly preferable.

In the embodiment of the present disclosure, the total amount of the electrode active material, which is a combination of the silicon-based electrode active material and the other types of electrode active materials, included may be in a range of 70 wt % to 99 wt % based on the total amount of solid content in the electrode slurry composition, which is preferably in the range of 80 wt % to 98 wt %. When the amount of the electrode active material included satisfies the above numerical range, excellent capacity characteristics may be achieved.

In the embodiment of the present disclosure, as the binder configured to obtain adhesive strength between the active materials or between the active material and a current collector, any binders commonly used in the field to which the present disclosure pertains may be usable, and the types thereof are not particularly limited. Examples of the binder used may include polyvinylidene fluoride (PVDF), vinylidene fluoride-hexafluoropropylene copolymers (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymers (EPDMs), sulfonated-EPDMs, styrene-butadiene rubber (SBR), fluorine rubber, or various copolymers thereof. Additionally, one of these binders may be used alone, or a mixture of two or more thereof may be used.

In the embodiment of the present disclosure, the binder may be included in the electrode slurry composition in an amount in a range of 5 wt % or less based on the total amount of the solid content, which is preferably in the range of 1 wt % to 3 wt %. When the amount of the binder included satisfies the above numerical range, excellent adhesive strength to electrodes may be achieved while minimizing an increase in electrode resistance.

In the embodiment of the present disclosure, the electrode slurry composition may further contain a solvent, if necessary, to adjust the viscosity and the like. In this case, the solvent may be water, an organic solvent, or a mixture thereof. Examples of the organic solvent may include: amide-based polar organic solvents, such as dimethylformamide (DMF), diethylformamide, dimethylacetamide (DMAc), and N-methylpyrrolidone (NMP); alcohols, such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols, such as ethylene glycol, diethylene glycol, triethylene glycol, propylene glycol, 1,3-propanediol, 1,3-butanediol, 1,5-pentanediol, or hexylene glycol; polyhydric alcohols, such as glycerin, trimethylolpropane, pentaerythritol, or sorbitol; glycol ethers, such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones, such as acetone, methyl ethyl ketone, methyl propyl ketone, or cyclopentanone; esters such as ethyl acetate, γ-butyl lactone, and ε-propiolactone, and the like. Additionally, one of these organic solvents may be used alone, or a mixture of two or more thereof may be used.

In the embodiment of the present disclosure, the electrode slurry composition may further contain additives such as viscosity modifiers and fillers, if necessary.

A fourth embodiment of the present disclosure provides an electrode including an electrode active material layer formed by the electrode slurry composition described above. Specifically, the electrode may be manufactured by applying the electrode slurry composition of the present disclosure described above and then drying the resulting product to form the electrode active material layer. More specifically, the electrode active material layer may be formed by a method of applying the electrode slurry composition on an electrode current collector and then drying the resulting product, or by a method of applying the electrode slurry composition on a separate support and then laminating a film obtained by being detached from the support on an electrode collector. If necessary, the electrode active material layer may be formed by the method, as described above, and then subjected to an additional rolling process. In this case, drying and rolling may be performed under appropriate conditions considering the physical properties of an electrode to be ultimately manufactured, but these conditions are not particularly limited.

In the embodiment of the present disclosure, the electrode current collector is not particularly limited as long as it is a conductive material that does not cause chemical changes in batteries. Examples thereof used may include copper, stainless steel, aluminum, nickel, titanium, and alloys thereof, these metals whose surface is treated with carbon, nickel, titanium, silver, and the like, or sintered carbon.

In the embodiment of the present disclosure, the electrode current collector may typically have a thickness in a range of 3 μm to 500 μm, and fine protrusions and depressions formed on the surface of the current collector may strengthen the bonding strength of the electrode active material. Additionally, the electrode current collector may be used in various forms, such as a film, sheet, foil, net, porous material, foam, and non-woven material.

In the embodiment of the present disclosure, the electrode may be a negative electrode.

A fifth embodiment of the present disclosure provides a lithium secondary battery including the electrode described above.

In the embodiment of the present disclosure, provided is a lithium secondary battery including a positive electrode, a negative electrode, a separator positioned between the positive and negative electrodes, and an electrolyte, in which at least one of the positive and negative electrodes is the electrode described above.

In the embodiment of the present disclosure, the separator is configured to separate the negative and positive electrodes and provide a passage for lithium ions to move. Any separators commonly used in secondary batteries may be usable without particular limitations. Specifically, as the separator, a porous polymer film, for example, a porous polymer film formed using polyolefin-based polymers, such as ethylene homopolymers, propylene homopolymers, ethylene/butene copolymers, ethylene/hexene copolymers, and ethylene/methacrylate copolymers, or a laminated structure thereof consisting of two or more layers may be used. Additionally, common porous non-woven fabrics, for example, non-woven fabrics made of polyethylene terephthalate fibers, glass fibers having high melting points, and the like, may be used. Furthermore, a coated separator containing ceramic components or polymeric materials may be used to obtain heat resistance or mechanical strength, which may be optionally used in a structure consisting of a single layer or multiple layers.

In the embodiment of the present disclosure, examples of the electrolyte may include an organic liquid electrolyte, an inorganic liquid electrolyte, a solid polymer electrolyte, a gel-type polymer electrolyte, a solid inorganic electrolyte, and a molten inorganic electrolyte, which may be usable when manufacturing lithium secondary batteries, but are not limited thereto.

MODE FOR INVENTION

Hereinafter, the present disclosure will be described in more detail through examples.

<Method of Measuring Physical Properties>

The physical properties of dispersion liquids of examples and comparative examples were measured using the following methods.

Measurement of Viscosity

A DVNextCP Rheometer manufactured by Brookfield was used, and the measurement was performed at a temperature of 25° C. by each independently varying shear rates to 15 $sec^{-1}$ and 150 $sec^{-1}$.

Measurement of Median Particle Size

A laser diffraction method was used, and a laser diffraction particle size measuring device (Malvern Mastersizer3000) available at this time was used. The median particle size (D50) based on 50% of the particle size distribution was calculated using the measuring device. On the other hand, D10 and D90 mean the particle sizes corresponding to 10% and 90% of the particle size distribution, respectively.

Measurement of pH

An ST3100 pH meter manufactured by OHAUS was used for measurement. An electrode was calibrated with a buffer solution at a temperature of 25° C., placed in a sample, stirred for 5 seconds, and then left for 30 seconds until the signal stabilized, followed by measuring the pH thereof.

Measurement of Solid Content

An MB95 moisture analyzer manufactured by OHAUS was used for the measurement. The initial weight was measured after placing about 3 g of a sample on an aluminum sample plate. The weight was measured while being heated up to a temperature of 150° C. However, once the weight changes by less than 1 mg in 60 seconds at a temperature of 150° C., this weight is set as the dry weight to calculate the solid content using the following equation.

$$\% DC \text{ (solid components)} = \text{dry weight/initial weight} \times 100\%$$

Measurement of Shear Thinning Index (STI)

The calculation was performed according to Equation 1 below.

$$\text{Shear thinning index } (STI) = V_{low}/V_{high} \quad \text{[Equation 1]}$$

In Equation 1 above, $V_{low}$ is the viscosity of a dispersion liquid measured at a temperature of 25° C. and a shear rate of 15 $sec^{-1}$, and $V_{high}$ is the viscosity of a dispersion liquid measured at a temperature of 25° C. and a shear rate of 150 $sec^{-1}$.

Calculation of Value Calculated by Equation 2

A physical property value expressed by Equation 2 below was calculated. In this case, STI is the shear thinning index (STI) of a dispersion liquid, and D50 is the median particle size (D50) of carbon nanotubes.

$$\frac{STI}{D50/\mu m} \quad \text{[Equation 2]}$$

<Preparation of Dispersion Liquid>

Example 1

Water as a solvent, 0.4 wt % of single-walled carbon nanotubes (TUBALL 01RW03, prepared by OCSiAl), 0.45 wt % of polyvinylpyrrolidone (K15, prepared by Sigma-Aldrich) as a first dispersant, and 0.15 wt % of tannic acid (prepared by Aldrich) as a second dispersant were mixed to prepare 1 kg of a carbon nanotube dispersion liquid.

In this case, the molar ratio of the alkali metal salt based on 100 mol of vinylpyrrolidone monomers was 7.7 mol [={(0.0075)/(24)}/{(0.45)/(111.14)}*100], according to Equation 3 below.

$$\text{Molar ratio of alkali metal salt} = \{(\text{wt \% of alkali metal salt})/(\text{molecular weight of alkali metal salt})\}/\{(\text{wt \% of polyvinylidone})/(\text{molecular weight of vinylidone monomers})\} * 100 \quad \text{[Equation 3]}$$

Examples and Comparative Examples

For the remaining examples and comparative examples, dispersion liquids were prepared by varying the weight and type of each material as shown in Tables 1 and 2 below, and the physical properties were tested.

TABLE 1

| | Classification | Example 1 | 2 | 3 | 4 | 5 |
|---|---|---|---|---|---|---|
| CNT | Amount of single-walled carbon nanotubes (wt %) | 0.4 | 0.4 | 0.4 | 0.4 | 0.4 |
| First dispersant | Amount of polyvinylidone-based resin (wt %) | 0.45 | 0.45 | 0.45 | 0.6 | 0.3 |
| | Type of polyvinylidone-based resin | K15 | K15 | K15 | K15 | K15 |
| Second dispersant | Amount of tannic acid compound (wt %) | 0.15 | 0.15 | 0.15 | 0.2 | 0.1 |
| — | Amount ratio of polyvinylidone-based resin and tannic acid compound | 3:1 | 3:1 | 3:1 | 3:1 | 3:1 |

TABLE 1-continued

| Classification | | Example 1 | 2 | 3 | 4 | 5 |
|---|---|---|---|---|---|---|
| Alkali metal salt | Weight of LiOH | 0.0075% | — | — | 0.010% | 0.005% |
| | Weight of NaOH | — | 0.0125% | — | — | — |
| | Weight of KOH | — | — | 0.0175% | — | — |
| | Amount of alkali metal element in dispersion liquid (ppm) | 22 | 68 | 124 | 24 | 18 |
| | Number of moles of alkali salt per 100 mol of N-vinylpyrrolidone | 7.7 | 7.7 | 7.7 | 7.7 | 7.7 |
| Physical properties | Viscosity (at 15/s) | 333.3 | 366.7 | 425.2 | 79.6 | 476 |
| | Viscosity (at 150/s) | 59 | 73.8 | 79 | 24.6 | 72 |
| | D50 (μm) | 4.17 | 4.56 | 4.78 | 1.59 | 4.97 |
| | pH | 5.43 | 6.7 | 6.6 | 7.08 | 5.64 |
| | Actual solid content (%) | 1.01 | 1.02 | 1.03 | 1.24 | 0.81 |
| | Equation 1 | 5.65 | 4.97 | 5.38 | 3.24 | 6.61 |
| | Equation 2 | 1.35 | 1.09 | 1.13 | 2.04 | 1.33 |

TABLE 2

| Classification | | Example 6 | Example 7 | Comparative Example 1 | Comparative Example 2 | Comparative Example 3 |
|---|---|---|---|---|---|---|
| CNT | Amount of single-walled carbon nanotubes (wt %) | 0.4 | 0.4 | 0.4 | 0.4 | 0.4 |
| First dispersant | Amount of polyvinylidone-based resin (wt %) | 0.45 | 0.45 | 0.45 | 0.45 | 0.6 |
| | Type of polyvinylidone-based resin | K12 | K17 | K15 | K15 | K15 |
| Second dispersant | Amount of tannic acid compound (wt %) | 0.15 | 0.15 | 0.15 | 0.15 | 0 |
| — | Amount ratio of polyvinylidone-based resin and tannic acid compound | 3:1 | 3:1 | 3:1 | 3:1 | — |
| Alkali metal salt | Weight of LiOH | 0.0075% | 0.0075% | — | 0.030% | — |
| | Weight of NaOH | — | — | — | — | — |
| | Weight of KOH | — | — | — | — | — |
| | Amount of alkali metal element in dispersion liquid (ppm) | 22 | 22 | 0 | 85 | 0 |
| | Number of moles of alkali salt per 100 mol of N-vinylpyrrolidone | 7.7 | 7.7 | 0 | 31 | 0 |
| Physical properties | Viscosity (at 15/s) | 140.6 | 328.8 | 2069 | 2303 | 5550 |
| | Viscosity (at 150/s) | 32.5 | 65.9 | 384 | 438 | 762 |
| | D50 (μm) | 1.8 | 1.94 | 10.9 | 9.7 | 21 |
| | pH | 6.96 | 7.06 | 4.01 | 7.89 | 4.75 |
| | Actual solid content (%) | 1.11 | 1.1 | 1.05 | 1.08 | 1.1 |
| | Equation 1 | 4.33 | 4.99 | 5.38 | 5.25 | 7.28 |
| | Equation 2 | 2.40 | 2.57 | 0.49 | 0.54 | 0.35 |

In Tables 1 and 2 above, K12, K15, and K17 refer to products prepared by from Aldrich.

It was confirmed from the above results that each of the dispersion liquids in the examples had a viscosity of 2.000 cPs or less at a temperature of 25° C. and a shear rate of 15 $sec^{-1}$.

From the above results, in the case where the dispersion liquid did not contain the tannic acid compound (Comparative Example 3), it was confirmed that the viscosity exceeded 5,000 cPs at a temperature of 25° C. and a shear rate of 15 $sec^{-1}$. Such viscosity characteristics significantly deteriorate the coating properties of the dispersion liquid, making the application thereof to a process challenging.

Additionally, in the case where the dispersion liquid did not contain the alkali metal salt (Comparative Example 2), it was confirmed that the viscosity exceeded 2,000 cPs at a temperature of 25° C. and a shear rate of 15 $sec^{-1}$. Such viscosity characteristics significantly deteriorate the coating properties of the dispersion liquid, making the application thereof to a process challenging.

On the other hand, even in the case where the dispersion liquid contained an excessive amount of the alkali metal salt, it was confirmed that the viscosity exceeded 2,000 cPs at a temperature of 25° C. and a shear rate of 15 sec−1 (Comparative Example 1).

The invention claimed is:

1. A carbon nanotube dispersion liquid comprising:
carbon nanotubes;
a first dispersant having an amide group;
a second dispersant having an aromatic ring and
an alkali metal salt;
wherein the dispersion liquid has a viscosity of 2,000 cPs or less at a temperature of 25° C. and a shear rate of 15 $sec^{-1}$
wherein the first dispersant comprises a polyvinylpyrrolidone-based resin, and
wherein the first dispersant comprises a polyvinylpyrrolidone-based resin, and a molar ratio of the alkali metal salt based on 100 mol of a vinylpyrrolidone monomer contained in the polyvinylpyrrolidone-based resin is 60 mol or less.

2. The dispersion liquid of claim 1, wherein the first dispersant comprises one or more types selected from the group consisting of polyvinylpyrrolidone, polyesteramide, polycarboxylic acid amide, polyamidoamine, thioamidoamine, and a water-soluble nylon compound.

3. The dispersion liquid of claim 1, wherein the second dispersant has a hydroxyl group or a carboxyl group.

4. The dispersion liquid of claim 1, wherein the first and second dispersants are comprised in a weight ratio in a range of 1:10 to 10:1.

5. The dispersion liquid of claim 1, wherein the carbon nanotubes are single-walled carbon nanotubes (SWCNTs).

6. The dispersion liquid of claim 1, wherein the carbon nanotubes have a median particle size (D50) in a range of 0.1 μm to 20 μm.

7. The dispersion liquid of claim 1, wherein the carbon nanotubes are comprised in an amount in a range of 0.01 wt % to 10 wt % based on the total weight of the dispersion liquid.

8. The dispersion liquid of claim 1, wherein the dispersion liquid comprises an alkali metal element.

9. The dispersion liquid of claim 1, wherein the alkali metal salt is one or more selected from the group consisting of KOH, NaOH, LiOH, $KOHH_2O$, $NaOHH_2O$, $LiOHH_2O$, $K_2CO_3$, $Na_2CO_3$, and $LiCO_3$.

10. The dispersion liquid of claim 1, wherein a value expressed by Equation 1 is in a range of 2 to 10, $$\text{Shear thinning index } (STI) = V_{low}/V_{high} \quad \text{[Equation 1]}$$

where in Equation 1, $V_{low}$ is a viscosity of the dispersion liquid measured at a temperature of 25° C. and a shear rate of 15 $sec^{-1}$, and $V_{high}$ is a viscosity of the dispersion liquid measured at a temperature of 25° C. and a shear rate of 150 $sec^{-1}$.

11. The dispersion liquid of claim 1, wherein a value calculated by Equation 2 is in a range of 1 to 5, $$\frac{STI}{D50/\mu m} \quad \text{[Equation 2]}$$

where in Equation 2, STI is a shear thinning index (STI) of the dispersion liquid, and D50 is a median particle size (D50) of the carbon nanotubes.

12. A method of preparing the dispersion liquid of claim 1, the method comprising:

mixing carbon nanotubes, a first dispersant having an amide group, and a second dispersant having an aromatic ring.

13. An electrode slurry composition comprising:

the dispersion liquid of claim 1;

an electrode active material; and a binder.

14. An electrode comprising an electrode active material layer formed by the electrode slurry composition of claim 13.

15. The electrode of claim 14, wherein the electrode is a negative electrode.

16. A lithium secondary battery comprising the electrode of claim 15.

* * * * *